(12) United States Patent
Gandrud

(10) Patent No.: US 7,111,458 B2
(45) Date of Patent: Sep. 26, 2006

(54) ELECTRICAL LOOP FLUSHING SYSTEM

(75) Inventor: Michael D. Gandrud, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 59 days.

(21) Appl. No.: 10/617,990

(22) Filed: Jul. 11, 2003

(65) Prior Publication Data

US 2005/0005600 A1   Jan. 13, 2005

(51) Int. Cl.
*F16D 31/02* (2006.01)

(52) U.S. Cl. ..................................................... 60/464

(58) Field of Classification Search ................. 60/454, 60/464
See application file for complete search history.

(56) References Cited

U.S. PATENT DOCUMENTS

| | | | |
|---|---|---|---|
| 4,373,869 A | 2/1983 | Martin et al. | |
| 4,531,369 A * | 7/1985 | Izumi et al. | 60/464 |
| 4,779,417 A | 10/1988 | Kita | |
| 5,215,444 A | 6/1993 | Bishoff | |
| 5,613,361 A | 3/1997 | Dantgraber et al. | |
| 5,666,807 A | 9/1997 | Bianchetta | |
| 6,145,312 A | 11/2000 | Hauser et al. | |
| 6,263,670 B1 | 7/2001 | Gluck et al. | |
| 6,339,928 B1 * | 1/2002 | Gollner | 60/464 |
| 6,397,590 B1 | 6/2002 | Hart | |
| 6,430,923 B1 | 8/2002 | Meier | |
| 6,474,064 B1 | 11/2002 | Hayne et al. | |
| 2002/0184881 A1 | 12/2002 | Oka | |

OTHER PUBLICATIONS

Yeaple, Fluid Power Design Handbook (New York, Marcel Dekker, Inc., 1996) pp. 82-87, TJ843.y63 1995.*

* cited by examiner

*Primary Examiner*—F. Daniel Lopez

(57) ABSTRACT

A loop flushing circuit in a closed circuit hydraulic system has a variable displacement hydraulic pump that is fluidly connected to a hydraulic motor. The flushing flow in the closed circuit is controlled by an electronically proportional flow control valve. The electronically proportional flow control valve is controlled by a control that ensures that the control valve being used is connected to a low pressure side of the closed loop flushing circuit.

10 Claims, 2 Drawing Sheets

ELECTRICAL LOOP FLUSHING SYSTEM

BACKGROUND OF THE INVENTION

This invention relates to an electrical loop flushing system for a closed circuit hydraulic transition. More specifically, and without limitation, this invention relates to an electrical loop flushing system that utilizes an electrically proportional flow control valve to regulate the flushing flow of a closed loop circuit of a hydraulic transmission.

In the art of hydraulics, oil is pumped by mechanical hydraulic pumps for the purpose of causing a hydraulic motor to revolve, a hydraulic cylinder to extend, or for other useful purposes. A common aspect of many tractors, earth-moving machines, and the like is a hydrostatic transmission. In its most basic form a hydrostatic transmission consists of a hydrostatic pump which is normally driven by an internal combustion engine, and provides a source of pressurized oil flow which causes one of more hydrostatic motors to rotate. The rotation of these one or more hydrostatic motors will cause the machine to travel forward or reverse as commanded by the driver of the machine.

Many hydrostatic transmissions operate in what is known as a closed loop system. In a closed loop system, pressurized oil from a pump is piped directly (or through valving) into a motor. Oil returning from the motor to the pump is also piped directly from the motor to the pump. This system is known as closed circuit because hydraulic fluid (i.e. hydraulic oil) normally circulates in a closed path between the pump and the motor without passing into a fluid reservoir on each pass.

This closed loop system is differentiated from an open loop circuit where a pump would draw hydraulic fluid from a fluid reservoir, the fluid is piped to the motor, and then the return fluid from the motor is piped back into a fluid reservoir.

Even on a closed loop system, a small reservoir and a charge pump will be used to collect the small amount of fluid which leaks out of the loop and to replace that flow so that the closed loop remains full of fluid at all times.

The technical and economic advantages of the closed loop circuit are advantageous in many applications. These advantages are well known in the industry and are therefore not further disclosed here. Two disadvantages of the closed loop circuit are also well know in the industry and must be overcome.

First, the hydraulic fluid in the closed loop is not normally run through a filter on each pass through the loop. While manufacturers of hydraulic fluids and hydraulic hardware go to lengths to produce products which are as free as possible of particulate contaminants, the operation of hydraulic machinery may cause a small amount of fine metallic particles to result from wear and to become entrained in the hydraulic fluid. Due to this undesired contamination, it is therefore desirable to slowly remove hydraulic fluid from the closed loop and to replace this oil with cleaned oil. By allowing a portion of the oil from the closed loop to pass through a particle filter, the purity of oil in the closed loop is maintained at a satisfactory level. This controlled leak is known as "loop flushing flow".

Second, when a hydrostatic transmission is operated under heavy loads for an extended period of time, it is possible for the oil which is pumped in the closed loop to become heated to an extent which may not be desirable. This heating occurs due to friction and other processes. Hydraulic fluid may degrade more quickly when maintained at excessive temperatures, thus requiring premature replacement of the hydraulic fluid. At elevated temperatures, hydraulic fluid may loose certain lubricating properties, thus failing to prevent damaging wear to the hydraulic machinery. In order to remove this heated oil from the closed loop, a "controlled leak" or loop-flushing system is employed to remove fluid from the circuit. This oil is then cooled and replaced back through the charge circuit.

For example, U.S. Pat. No. 6,430,923 to Meier discloses an electrical loop flushing system in a closed loop hydraulic motor. The '923 device teaches the use of a single non-proportional electrical valve to control loop flushing flow. Because a non-proportional electrical valve is used, an operator is unable to intelligently select the loop flushing flow. Because the '923 device is unable to intelligently select the loop flushing flow, under certain conditions the closed loop will perform inefficiently compared to the present invention. Therefore, the present invention is considered an improvement over the '923 device.

Other prior art discloses closed loop flushing systems. Usually the flushing system uses a shuttle valve that is connected to both the high pressure and low pressure fluid paths on a closed loop hydrostatic system. The shuttle valve is configured to select the lower pressure line of the two hydraulic system pressure lines in the closed loop system. The shuttle valve is further connected to an orifice, or to a pressure relief valve, or to some combination of both. This relief valve serves to relieve loop charge pressure and to control the release of hydraulic fluid from the loop.

While this system does function effectively, several deficiencies are present. For example, when the shuttle valve shifts from selecting one pressure line to selecting the other pressure line, a small amount of oil is instantaneously removed from the closed loop. This condition happens whenever a vehicle changes its driving direction. This condition also occurs whenever a vehicle transitions from uphill driving to downhill driving or vise versa. The charge system must be sized to rapidly replace the sudden loss of a small amount of hydraulic fluid.

Current flushing flow systems that use a shuttle valve are expensive to make and maintain. A shuttle valve is a costly precision machined device which is susceptible to malfunction due to particle contamination. Because of this precision and the fact shuttle valves are apt to malfunction, the cost of the shuttle valve and replacing it can be substantial. Furthermore, under certain operating conditions the loop flushing flow will be greater than desired; therefore, a larger charge pump is required for these operating conditions. This larger charge pump is more expensive to make or purchase.

Besides costs, another problem with current loop flushing systems that incorporate a shuttle valve and a relief valve is that they cannot be intelligently controlled. Because the system is not intelligently controlled, the loop flushing action occurs whenever the transmission is operational. Therefore, a loop flushing system must be seized to flush an adequate flow of hydraulic fluid under the worst case operating condition. Consequently, the volume of loop flushing flow will therefore always be as high as the flow required under the most severe operating conditions. Because the loop flushing flow is higher than desired under certain operating conditions, a larger charge pump is required which will consume more energy and result in increased system energy losses.

When a machine which includes a closed loop fluid circuit and a charge pump is operating at low engine speed, the charge pump will also pump a small flow of hydraulic fluid. This property limits the lowest engine speed at which the machine can operate, requires an enlarged charge pump, and possibly leads to a risk that the closed loop circuit may not remain completely full of fluid.

Loop flushing flow also causes energy and system efficiency loss. Because the fluid in the loop is pressurized, loop flushing flow causes a loss or waste of hydraulic energy. This loss ultimately requires more power from the internal combustion engine and higher fuel consumption than would be otherwise required. Use of a modulated loop flushing flow would limit this power loss to the lowest necessary loss.

All of these issues are avoided when the loop flushing flow is intelligently controlled and modulated as operating conditions dictate. Because the loop flushing flow is intelligently controlled as required, and stopped completely when required by conditions like a low engine speed, the hydraulic transmission becomes more efficient. For example, when the engine is running at low speed, the machine is normally not doing significant work, therefore little heat and contaminants are generated, thus the need for loop flushing is minimal. By intelligently controlling the loop flushing at a minimal level much inefficiency is avoided.

Thus, it is a primary object that the present invention to provide an electrical loop flushing system that improves upon the state of the art.

Another object of the present invention is to provide an electrical loop flushing system that can be intelligently controlled.

Yet another object of the present invention is to provide an inexpensive device that controls loop flushing flow.

Another object of the present invention is to reduce the size of a charge pump needed in a closed circuit hydrostatic transmission.

Yet another object of the present invention is to utilize an electrical proportional control valve to control loop flushing flow.

Another object of the present invention is to provide a device that will more efficiently remove fluid from a closed loop hydraulic circuit than in the prior art.

These and other objects, features, or advantages of the present invention will become apparent from the specification and claims.

BRIEF SUMMARY OF THE INVENTION

The present invention is an electrical loop flushing system for a closed circuit hydraulic motor. The loop flushing circuit has a variable displacement hydraulic pump that is fully connected to a hydraulic motor creating the closed loop circuit. The circuit includes an electrically proportional flow control valve in both system pressure lines that is used to regulate the flushing flow of the closed loop circuit. There is also a control means that is connected to the control valves so that the valves may be intelligently controlled by an operator or automatic controller. This control means causes loop flushing flow to be activated only by the control valve that is connected to a low pressure side of the flushing circuit.

DETAILED DESCRIPTION OF THE INVENTION

Figure 1:
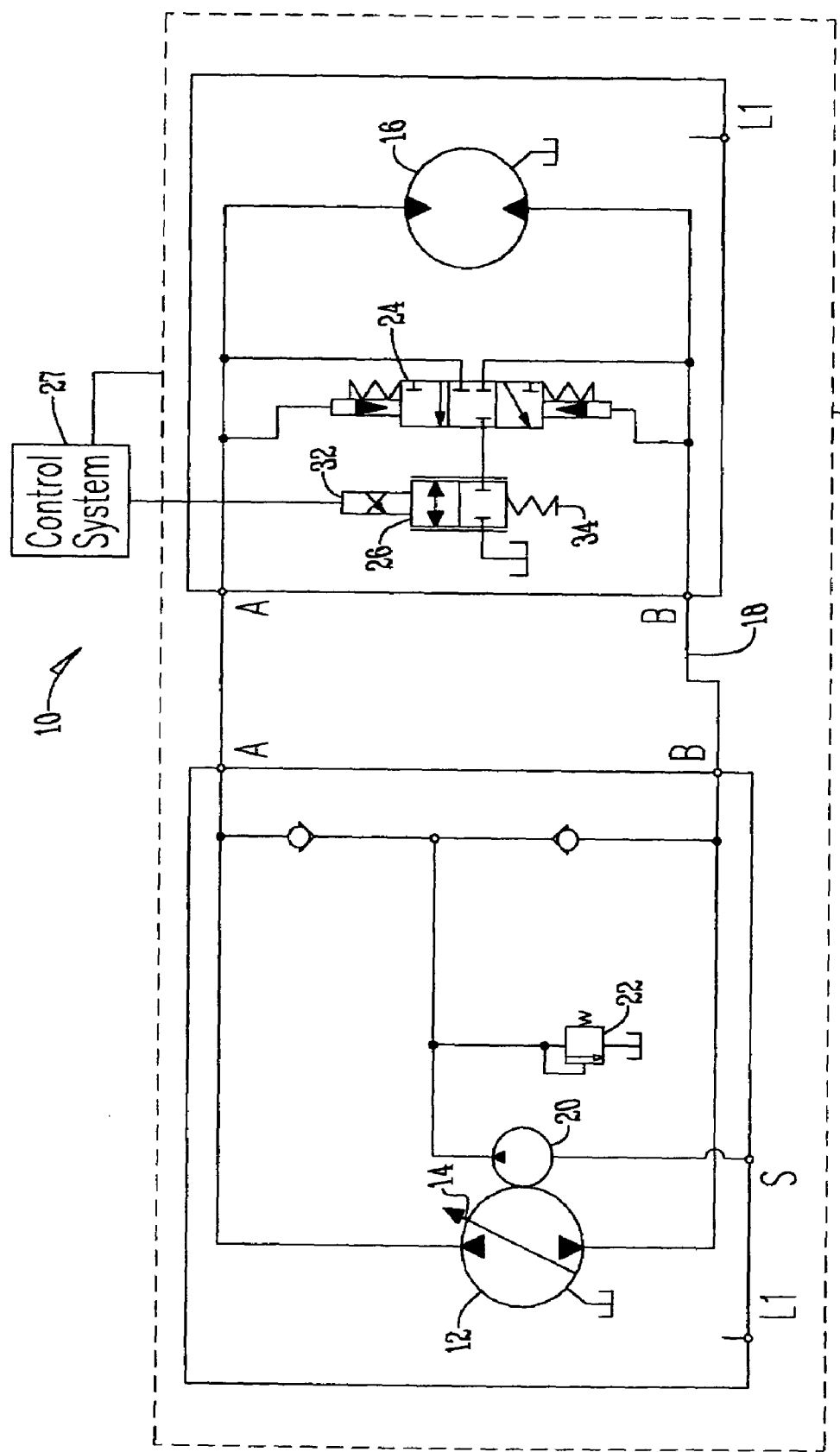
FIG. 1 is a schematic of a closed circuit hydraulic transmission where the hydraulic motor includes a loop flushing shuttle valve and a loop flushing electrical proportional valve.

The loop flushing circuit 10 of the present invention is used in closed circuit hydrostatic transmissions that are used to run moving vehicles such as tractors, land moving equipment, and lawnmowers. The closed loop flushing circuit 10 has a variable displacement hydraulic pump 12 that has a swashplate 14. The closed loop system also has a motor 16 connected to the variable displacement hydraulic pump 12 by hydraulic lines 18. Variable displacement hydraulic pump 12 is also connected fluidly to fixed displacement charge pump 20 and a charge pressure relief valve 22. The charge pressure relief valve 22 establishes the charge pressure at which the charge pump 20 delivers fluid to the low pressure side of the loop. Other conventional valves for high pressure relief, bypass, and flow control can be utilized.

As seen in FIG. 1 the motor 16 in this closed loop flushing circuit 10 uses a shuttle valve 24 fluidly connected to an electronically proportional flow control valve 26. It should be noted that both poppet and spool valve designs are contemplated for this invention. The shuttle valve 24 can be used for selecting the low pressure closed loop hydraulic line. The electrically proportional flow control valve 26 can thereby be used as a means of regulating the loop flushing flow. The electrically proportional flow control valve 26 may be controlled by an electric signal sent by a control system 27.

Figure 2:
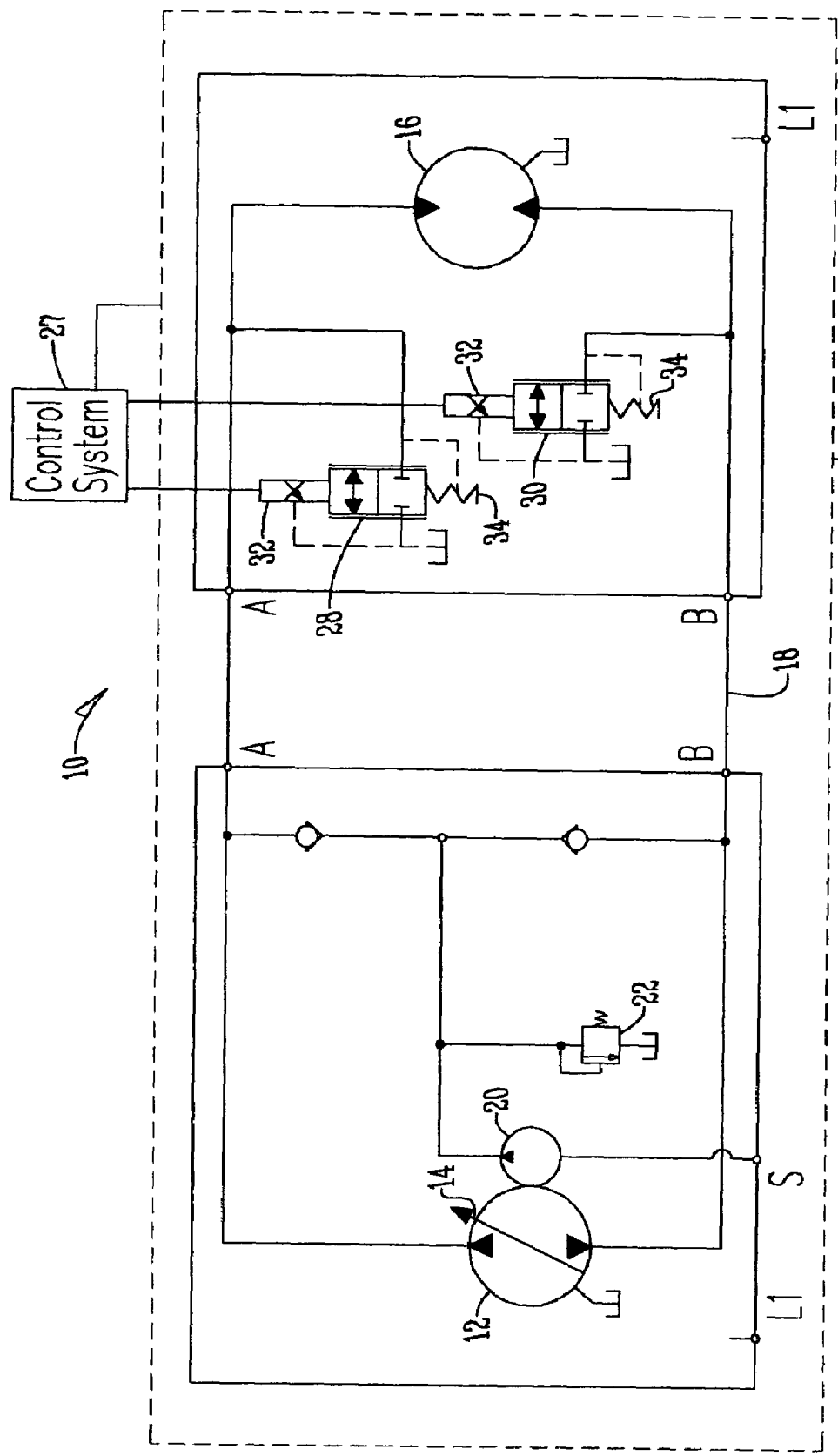
FIG. 2 is a schematic of a hydrostatic motor using only loop flushing electrical proportional valves.

The control system 27 can be an electrical actuator, proportional actuator, or another valve actuator. The control system can also be used to detect operational parameters of the hydraulic system 11 (as shown in FIGS. 1 and 2). From these operational parameter readings the control system 27 will actuate the valve 26 according to the need of the system. These parameters include, but are not limited to the temperature of the hydraulic fluid in the closed loop, the pressure in the closed loop hydraulic line 18 with alternating high or low pressure sides A and B, the temperature in the case of the hydraulic unit, the temperature of a bearing, contamination in the hydraulic fluid, or the temperature of a brake. The control system can use a control algorithm such as: Proportional Integral Differential, Fuzzy logic, Observer, or Lead Lag to determine the operation of the valve 26.

In an alternative embodiment, another improved loop flushing system is depicted in FIG. 2. This improved system does not incorporate a shuttle valve 24 for selecting the low pressure closed loop hydraulic line. Rather, this system uses two electronically proportional flow control valves 28, 30 as a means of regulating the loop flushing flow. By using two valves, a control system 27 can activate only the valve which is connected to the low pressure side of the loop. By using these valves 28, 30, flow can be intelligently controlled in order to provide a loop flushing flow which is selected to improve system efficiency and for other purposes. The electronically proportional flow control valves 28, 30 are designed such that an electrical signal can be sent to solenoid 32 to proportionally open the valve against a small spring 34. The spring chamber is referenced to the line pressure.

In operation the valves 28, 30 are so designed that a control system 27 such as an electrical actuator is able to open the valves 28, 30 against a normal charge pressure, but it is not able to open the valves 28, 30 when the line is a higher system pressure. As an example, if the line pressure is not more than 40 bar or about 600 PSI above the case pressure, the actuator 27 will be able to open the valves 28, 30. As a further example, when line operates at a high pressure the line pressure such as 100 bar or 1500 PSI or more, the pressure will force and hold close the valves 28, 30 even if an electrical signal is being sent to open the valves 28, 30. Hence the valves 28, 30 are intelligent.

It will be appreciated by those skilled in the art that other various modifications could be made to the device without departing from the spirit and scope of this invention. All such modifications and changes fall within the scope of the claims and are intended to be covered thereby.

What is claimed is:

1. A loop flushing circuit comprising:
   a variable displacement hydraulic pump;
   a hydraulic motor fluidly connected to the pump connected to a closed loop circuit by first and second system pressure lines;
   an electrically proportional control valve connected to at least one of the system pressure lines and is fluidly connected to the hydraulic motor and adapted to regulate the flushing flow of the closed loop circuit, and
   a control means connected to the control valve in order to provide a loop flushing flow by activating the control valve when the at least one of the system pressure lines is a low pressure side of the loop flushing circuit wherein when at least one of the system pressure lines is at a threshold pressure, the threshold pressure holds close the electrically proportional control valve when an electrical signal is sent from the control means to open the electrically proportional control valve.

2. The loop flushing circuit of claim 1 wherein the control means is a valve actuator.

3. The loop flushing circuit of claim 1 wherein the control means is an electrical actuator.

4. The loop flushing circuit of claim 1 wherein the electrically proportional flow control valve is a spool valve.

5. The loop flushing circuit of claim 1 wherein the electrically proportional flow control valve is a poppet valve.

6. A loop flushing circuit comprising:
   a variable displacement hydraulic pump;
   a hydraulic motor fluidly connected to the pump in a closed loop circuit by first and second system pressure lines;
   a first control valve connected to the first system pressure line is fluidly connected to the hydraulic motor and adapted to regulate the flushing flow of the closed loop circuit;
   a second control valve connected to the second system pressure line is fluidly connected to the hydraulic motor and adapted to regulate the flushing flow of the closed loop circuit; and
   a control means connected to the first and second control valves in order to provide a loop flushing flow by activating only the control valve which is connected to a low pressure side of the loop flushing circuit;
   wherein at least one of the control valves is an electrically proportional flow control valve.

7. The loop flushing circuit of claim 6 wherein the control means is a valve actuator.

8. The loop flushing circuit of claim 6 wherein the control means is an electrical actuator.

9. The loop flushing circuit of claim 6 wherein at least one of the control valves is a spool valve.

10. The loop flushing circuit of claim 6 wherein at least one of the control valves is a poppet valve.

\* \* \* \* \*